United States Patent
Rajupillai

(10) Patent No.: US 10,480,937 B2
(45) Date of Patent: Nov. 19, 2019

(54) SYSTEM FOR SIMULTANEOUS MEASUREMENT OF WHEEL ALIGNMENT ANGLES AND WHEEL RUNOUT OF MULTI-AXLE VEHICLES

(71) Applicant: MANATEC ELECTRONICS PVT. LTD., Puducherry (IN)

(72) Inventor: Mananathan Rajupillai, Puducherry (IN)

(73) Assignee: MANATEC ELECTRONICS PVT. LTD., Puducherry (IN)

(*) Notice: Subject to any disclaimer, the term of this patent is extended or adjusted under 35 U.S.C. 154(b) by 148 days.

(21) Appl. No.: 15/332,886

(22) Filed: Oct. 24, 2016

(65) Prior Publication Data

US 2017/0219340 A1    Aug. 3, 2017

(30) Foreign Application Priority Data

Jan. 28, 2016    (IN) .............................. 201641003112

(51) Int. Cl.
| | |
|---|---|
| *G01B 11/275* | (2006.01) |
| *G06T 7/00* | (2017.01) |
| *H04N 5/225* | (2006.01) |
| *H04N 5/247* | (2006.01) |
| *H04N 7/18* | (2006.01) |

(52) U.S. Cl.
CPC ........ *G01B 11/2755* (2013.01); *G06T 7/0004* (2013.01); *H04N 5/2253* (2013.01); *H04N 5/247* (2013.01); *H04N 7/181* (2013.01); *G01B 2210/143* (2013.01); *G01B 2210/30* (2013.01); *G06T 2207/30204* (2013.01); *G06T 2207/30252* (2013.01)

(58) Field of Classification Search
CPC .......... G01B 11/2755; G01B 2210/143; G01B 2210/30; H04N 7/181; H04N 5/247; H04N 5/2253; G06T 7/0004; G06T 2207/30204; G06T 2207/30252
USPC ......................................................... 348/139
See application file for complete search history.

(56) References Cited

U.S. PATENT DOCUMENTS

| | | | | |
|---|---|---|---|---|
| 4,718,759 A | * | 1/1988 | Butler .................. | G01B 11/275 33/203.18 |
| 5,969,246 A | * | 10/1999 | Jackson ............. | G01B 11/2755 33/203.18 |
| 6,298,284 B1 | * | 10/2001 | Burns, Jr. ............ | G01B 11/275 356/139 |

(Continued)

*Primary Examiner* — Richard A Hansell, Jr.
(74) *Attorney, Agent, or Firm* — Workman Nydegger

(57) ABSTRACT

A system for simultaneous measurement of "Wheel runout" and "Wheel alignment angles" of a multi-axle vehicle having a plurality of axles and wheels comprises wheel targets, at least two camera modules, and an alignment control module. The plurality of wheel targets is respectively mounted on the axle wheels. Each of the camera modules has a camera that is configured to capture images of the plurality of wheel targets. The alignment control module has a processor co-operating with each of the camera module and configured to capture and analyze the images of the targets to compute the "Runout" and "Wheel Alignment angles" of all the wheels of all the axles simultaneously. The processor is further configured to compare the analyzed wheel alignment angles with a predetermined range of acceptable wheel alignment angles.

7 Claims, 4 Drawing Sheets

(56) References Cited

U.S. PATENT DOCUMENTS

| | | | | |
|---|---|---|---|---|
| 6,684,516 B2* | 2/2004 | Voeller | ............... | G01B 5/255 |
| | | | | 33/203 |
| 7,040,026 B2* | 5/2006 | Hirano | ............... | G01B 5/255 |
| | | | | 33/203 |
| 7,065,462 B2* | 6/2006 | Merrill | ............... | G01B 11/275 |
| | | | | 348/E7.087 |
| 7,313,869 B1* | 1/2008 | Rogers | ............... | G01B 11/2755 |
| | | | | 33/203.18 |
| 8,890,946 B2* | 11/2014 | Publicover | ............... | H04N 7/18 |
| | | | | 348/78 |
| 9,779,561 B1* | 10/2017 | Dorrance | ............... | G07C 5/0808 |
| 2008/0170222 A1* | 7/2008 | Strege | ............... | G01B 11/2755 |
| | | | | 356/139.09 |
| 2011/0221867 A1* | 9/2011 | Nobis | ............... | G01B 11/275 |
| | | | | 348/46 |
| 2014/0111645 A1* | 4/2014 | Shylanski | ............... | G01B 11/2755 |
| | | | | 348/148 |
| 2014/0253909 A1* | 9/2014 | McClenahan | ............... | G01B 11/2755 |
| | | | | 356/139.09 |
| 2015/0097924 A1* | 4/2015 | Hauk | ............... | G03B 15/06 |
| | | | | 348/36 |
| 2015/0242855 A1* | 8/2015 | Vilnai | ............... | B67D 7/34 |
| | | | | 705/44 |

* cited by examiner

SYSTEM FOR SIMULTANEOUS MEASUREMENT OF WHEEL ALIGNMENT ANGLES AND WHEEL RUNOUT OF MULTI-AXLE VEHICLES

CROSS REFERENCE TO RELATED APPLICATIONS

This application claims priority to Indian Application Number 201641003112, filed on Jan. 28, 2016, the entirety of which is incorporated herein by reference.

FIELD

The present disclosure relates to the field of automobile engineering. In particular, the present disclosure relates to the field of Wheel Alignment and Wheel runout determination and correction techniques for multi-axle vehicles.

BACKGROUND

Presently, various systems and methods are in use for wheel alignment of multi-axle vehicles. The present procedure for measuring the "Wheel alignment angles" and "Wheel runout" of the multi-axle vehicle involves the wheel target along with Wheel Brackets to be demounted from one wheel and mounted onto another wheel, resulting in an independent assessment of the wheel Runout and acquisition of alignment data one by one. This requires lifting each wheel everytime the Runout has to be done and involve considerable amount of time and human energy to complete the alignment of each wheel of a multi-axle vehicle.

Therefore, a need was felt for developing a system for simultaneous measurement of "Wheel runout" and "wheel alignment angles" of a multi-axle vehicle which will eliminate the aforementioned drawbacks.

SUMMARY

The present disclosure envisages a system for simultaneous measurement of "Wheel alignment angles" and "Wheel runout" of multi-axle vehicles having a plurality of axle wheels. The system comprises a plurality of wheel targets, at least two camera modules, and an alignment control module. The plurality of wheel targets is respectively mounted on the wheels of the axles. Each of the camera modules has a camera that is configured to capture images of the plurality of wheel targets. The alignment control module has a processor co-operating with each of the camera module and configured to capture and analyze the images of the Targets to compute the "Runout" and "Wheel Alignment angles" of all the wheels of all the axles simultaneously. The processor is further configured to compare the analyzed wheel alignment parameters with a predetermined specification range of acceptable wheel alignment parameters. The processor is also configured to communicate the error in wheel alignment parameters before correction and enables the mechanic to enable correction by graphical display.

In an embodiment, the system further includes at least one vertical column per side that is configured to facilitate mounting of the at least two camera modules thereon. The Vertical column is meant to support the mounting of Camera modules only. Hence the mechanical setup to support the camera module is not limited to the present disclosure.

In another embodiment, at least two camera modules include a bottom camera module and a top camera module.

In one embodiment, each of the at least two camera modules further includes a camera transceiver that is configured to receive the captured images from the camera. The camera transceiver is further configured to transmit the captured images to the alignment control module.

In another embodiment, the system further includes an application module that is configured to illuminate the plurality of wheel targets with variable intensity considering the environmental illumination changes.

In still another embodiment, the alignment control and processing module further includes a central transceiver. The central transceiver works with each of the camera modules and is configured to receive the captured images. The alignment control and processing unit is configured to store the predetermined set of data that includes acceptable ranges of wheel alignment parameters.

In yet another embodiment, the system further includes a display unit that co-operates with the alignment control module. The display unit is configured to display the initial and final wheel alignment parameters of the multi-axle vehicle besides guiding the mechanic to effect the correction needed in the right direction.

In still another embodiment, the system is communicatively coupled with an input device that allows the user to interface with the system as mandated.

The present disclosure discloses a technology to capture more than two target images and not limited to three target images in one camera and concurrent processing techniques of the images of all the wheels of the multi-axle vehicle. The disclosure pertains to this technique of handling more than two images of Targets at the same time in a single Camera.

OBJECTS

Some of the objects of the present disclosure, which at least one embodiment herein satisfies, are as follows:

It is an object of the present disclosure to eliminate one or more problems of the prior art or to at least provide a useful alternative.

An object of the present disclosure is to provide a system for simultaneous measurement of all "wheel alignment angles" of all the wheels of a multi-axle vehicle at a time instead of doing one-by-one.

Another object of the present disclosure is to provide a system for simultaneous measurement of "Wheel Runout" in all the wheels of a multi-axle vehicle simultaneously instead of doing one-by-one.

Yet another object of the present disclosure is to deploy two Cameras per side totaling but not limited to four camerasto view all the wheel targets simultaneously to acquire all wheel alignment parameters at a time.

Yet another object of the present disclosure is to deploy at least one camera module per side of the multi-axle vehicle wheels to view all the wheel targets simultaneously to acquire all wheel alignment parameters at a time.

Still another object of the present disclosure is to develop software to acquire the wheel alignment parameters of all wheels while in motion for simultaneous wheel runout measurement.

Yet another object of the present disclosure is to acquire all wheel alignment data at a time from all the wheels and process them in a single computer and deliver the desired results of wheel alignment.

Yet another object of this present disclosure is to develop a software to enable and guide the mechanics pictorially to easily understand and effect the wheel alignment corrections.

Other objects and advantages of the present disclosure will be more apparent from the following description when read in conjunction with the accompanying drawing, which are not intended to limit the scope of the present disclosure.

BRIEF DESCRIPTION OF ACCOMPANYING DRAWING

The present disclosure will now be explained in relation to the non-limiting accompanying drawing, in which:

FIG. 2 illustrates a block diagram of the system disclosed in the FIG. 1 and FIG. 1a.

LIST OF REFERENCE NUMERALS

100—System
105—Multi-axle vehicle
110—Axle wheels
115—A plurality of wheel targets
120a—Left vertical column
120b—Right vertical column
125a—Bottom camera module
125b—Top camera module
127—Camera
129—Camera transceiver
130—Alignment control module
135—Central transceiver
140—Processor
145—Repository
150—Input device
155—Display unit
160—Vehicle pusher for alignment runout
165—Wheel alignment pit
170—Rotary plate or Turn table

Definitions

As used in the present disclosure, the following terms are generally intended to have the meaning as set forth below, except to the extent that the context in which they are used indicate otherwise.

The expression 'Wheel Target' used hereinafter in the specification refers to a structure that is physically mounted on the wheels of the vehicle for alignment purpose.

The expression 'Runout' used hereinafter in the specification refers to an error in wheel caused by the wobbling effect which results in imperfect rotation of the wheel on its axis while on the road and needs to be considered for proper wheel alignment.

The expression 'Multi-Axle vehicle' used in this application means a vehicle having more than two axles.

The expression 'Processor' means a hardware such as a Personal computer, Industrial computer, Single board computer with all the required software to execute the following functions as given below:

To acquire the target images of all the wheels simultaneously and analyze the images of the Targets to compute the "Runout" and "Wheel Alignment angles" using image processing technique. Illumination of wheel targets with variable intensity is also controlled while acquiring the target images.

To compare the computed wheel alignment angles with predetermined specification range of acceptable wheel alignment parameters and display to guide the mechanics pictorially to easily understand and effect the wheel alignment corrections.

DETAILED DESCRIPTION

The conventional systems being used for measuring the "wheel alignment angles" and "Wheel runout" of the multi-axle vehicle requires a wheel target to be demounted from one axle wheel and mounted onto another axle wheel, resulting in an independent assessment of the alignment data and runout data for each axle wheel. This requires considerable expenditure of time and energy to complete the alignment of each axle wheel of the multi-axle vehicle.

The present disclosure envisages a system for simultaneous measurement of "wheel alignment angles" and "Wheel runout" of multi-axle vehicles that is designed to overcome the drawbacks of the conventional systems. A preferred embodiment of the system for simultaneous measurement of "Wheel alignment angles" and "Wheel runout" of multi-axle vehicles, of the present disclosure will now be described in detail with reference to the accompanying drawing. The preferred embodiment does not limit the scope and ambit of the disclosure. The description provided is purely by way of example and illustration.

Figure 1:
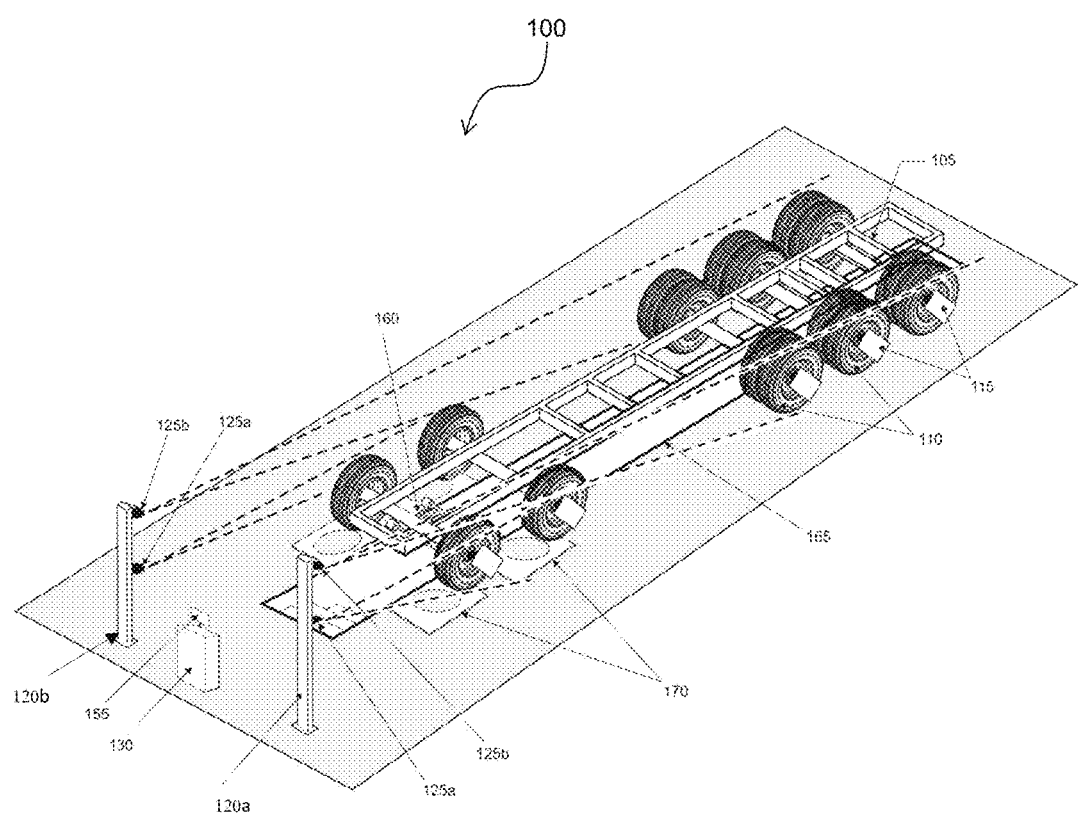
FIG. 1 illustrates an isometric view of a system and vehicle's position for simultaneous measurement of "Wheel runout" of multi-axle vehicles.
Figure 1A:
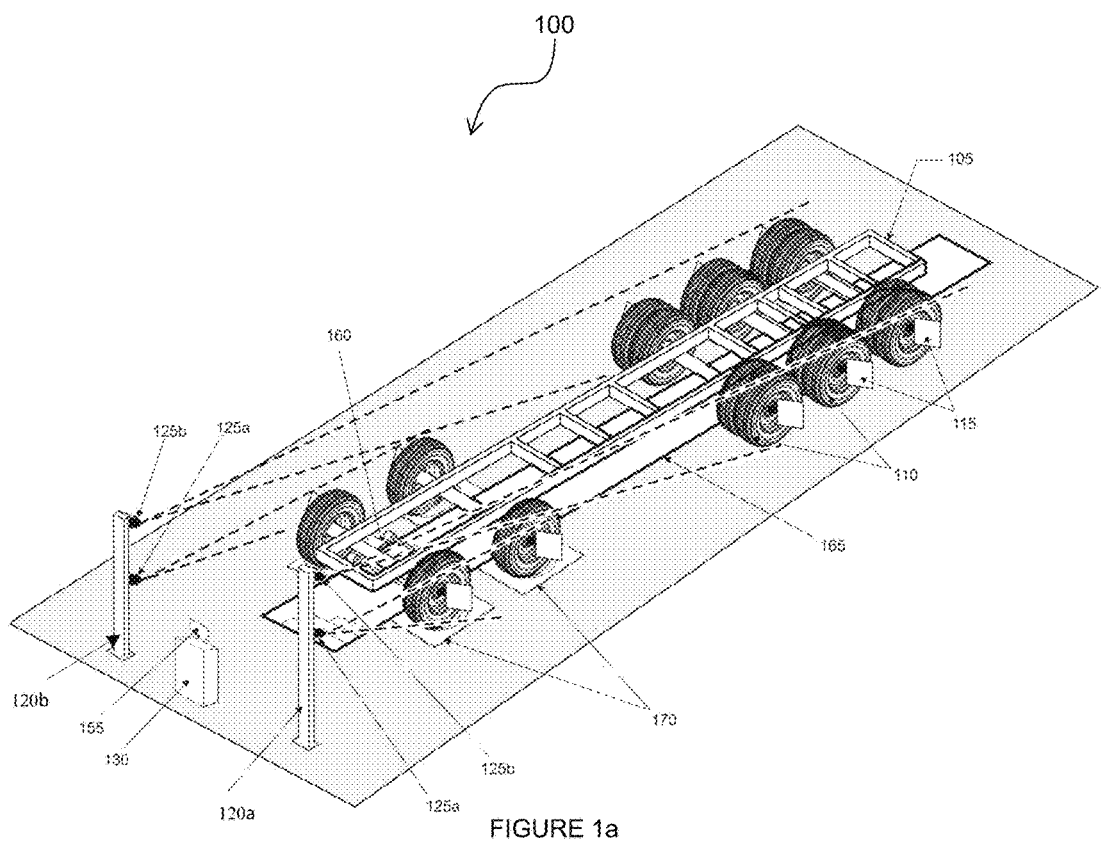
FIG. 1a illustrates an isometric view of a system and vehicle's position for simultaneous measurement of "Wheel runout" and "Wheel alignment angles" of multi-axle vehicles.
Figure 2:
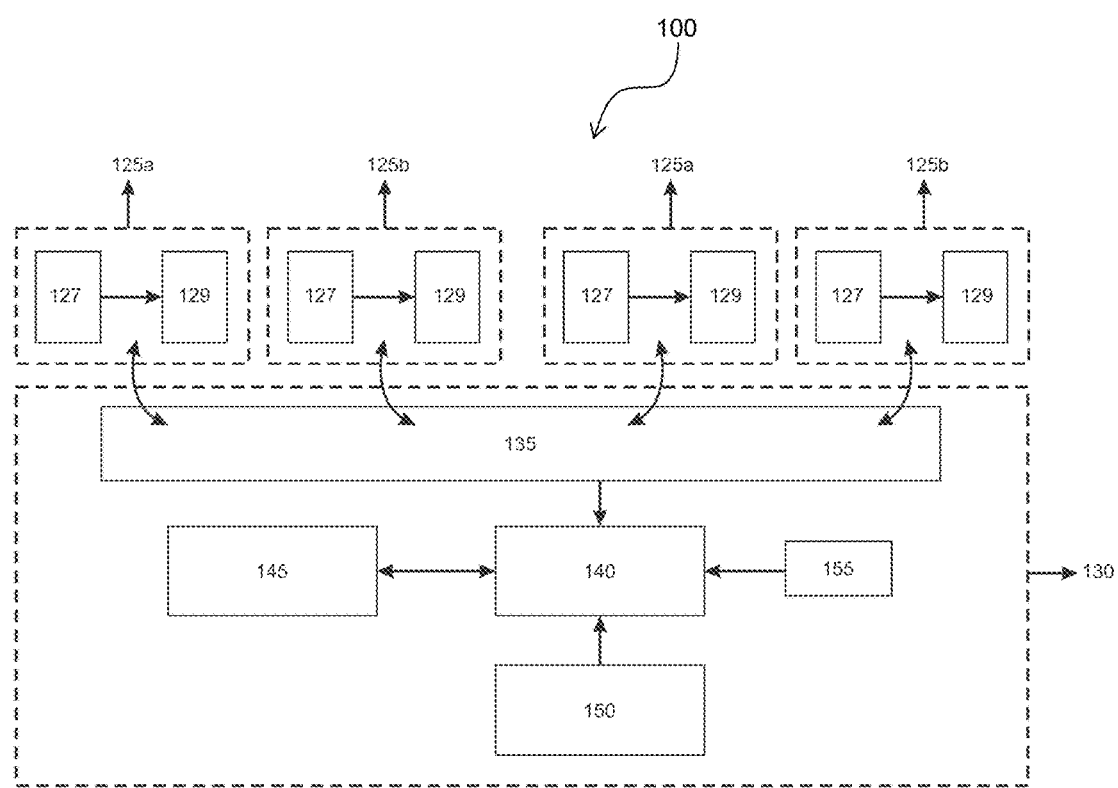

FIG. 1 & FIG. 1a illustrates an isometric view of a system for simultaneous measurement of "Wheel runout" and "wheel alignment angles" of a multi-axle vehicle 105. FIG. 2 illustrates a block diagram of the system disclosed in the FIG. 1.

FIG. 1 and FIG. 1a depicts the position of various camera modules 125a, 125b of a system for simultaneous measurement of "Wheel alignment angles" and "Wheel runout" of multi-axle vehicles (hereinafter referred as 'system 100') with respect to various wheels of a multi-axle vehicle 105.

The system 100 includes a plurality of wheel targets 115, two camera modules 125a, 125b, and an alignment control module 130. The plurality of wheel targets 115 is respectively mounted on the axle wheels 110 of the Multi-axle vehicle 105 positioned on the wheel alignment pit 165. Each camera module 125a, 125b has a camera 127 that is configured to capture images of the plurality of wheel targets 115. The alignment control module 130 has a processor 140 that co-operates with each of the camera modules 125a, 125b and is configured to analyze the captured images to compute "Wheel alignment angles" and "Wheel runout" for each of the axle wheels 110. The processor 140 is further configured to compare the computed wheel alignment angles with a predetermined range of acceptable wheel alignment angles for that particular vehicle. In an embodiment, the at least two camera modules 125a, 125b includes a bottom camera module 125a and a top camera module 125b. In an embodiment, the processor 140 is an image processor.

The system further includes at least one vertical column 120a, 120b that is configured to facilitate the mounting of the at least two camera modules 125a, 125b. The bottom camera module 125a is mounted on an operative bottom portion of the at least one vertical column 120a, 120b and the top camera module 125b is mounted on an operative top portion of the at least one vertical column 120a, 120b. In an embodiment, the bottom camera module 125a and the top camera module 125*b* are fixed to a right vertical column 120*b* at a defined height to cover one side of the multi-axle vehicle 105 in such a way that the bottom camera module 125*a* is set to focus on the front axle wheels 110 to a maximum and not limited to two axles at a time and the top camera module 125*b* is set to focus on the rear axle wheels 110 to a maximum and not limited to three axles at a time. Similarly, on a left vertical column 120*a*, at least two camera modules 125*a*, 125*b* are deployed to cover the other side of the multi-axle vehicle 105.

In another embodiment, single camera module 125*b* is fixed to a right vertical column 120*b* at a defined height to cover one side of the multi-axle vehicle 105 in such a way that the camera module 125*b* is set to focus on the front axle wheels 110 and the rear axle wheels 110 to a maximum and not limited to three axles at a time. Similarly, on the left vertical column 120*a*, a single camera module 125*b* is deployed to cover the other side of the multi-axle vehicle 105.

In one embodiment, the camera 127 is a digital camera of a suitable pixel for measuring wheel angles. Further, each of the camera modules 125*a*, 125*b* is fitted with a powerful wide angle lens for covering minimum to maximum wheel sizes available. The selection of an appropriate camera with an appropriate focal length lens, and the distance at which the camera has to be placed from the wheels are critical parameters of the wheel alignment system. Also, the lighting and illumination of the plurality of wheel target 115 needs to be appropriate to enable the cameras to take clear images of the wheels. In an embodiment, the system 100 includes an alignment control module that is configured to variably illuminate the plurality of wheel targets 115. The distance at which the camera 127 is located also determines the quality of the images to be captured and processed for further analysis.

In an embodiment, each of the at least two camera modules 125*a*, 125*b* further includes a camera transceiver 129. The camera transceivers 129 are configured to co-operate and receive the captured images from the respective camera 127. The camera transceiver 129 is further configured to transmit the captured images provided to the alignment control module 130.

The alignment control module 130 further includes a central transceiver 135 and a repository 145. The central transceiver 135 co-operates with each of the camera modules 125*a*, 125*b* and is configured to receive the captured images from the camera transceivers 129. In an embodiment, each of the camera transceiver 129 is in wired communication with the central transceiver 135. In another embodiment, each of the camera transceivers 129 is in wireless communication with the central transceiver 135. The repository 145 is configured to store the predetermined set of data that includes acceptable ranges of wheel alignment angles.

Figure 3:
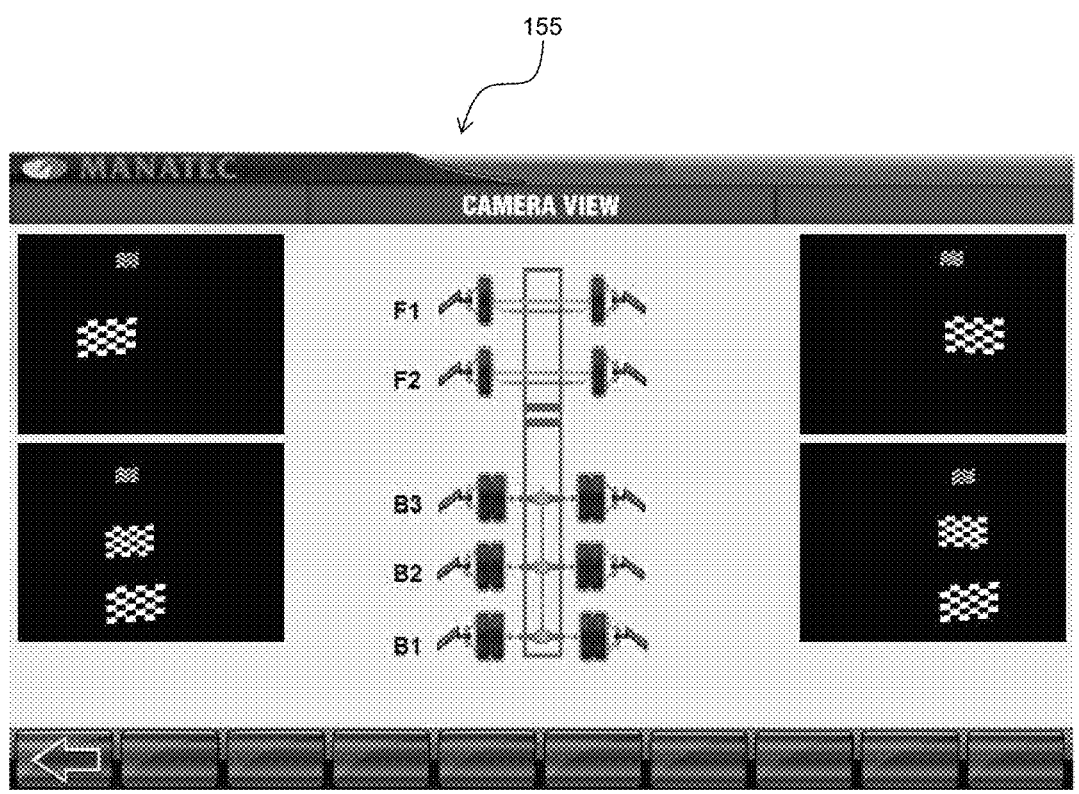
FIG. 3 illustrates a camera view of all wheel targets attached to a multi-axle vehicle using a front end software module of the system on a display unit.

FIG. 3 illustrates a camera view of all wheel targets 115 attached to the multi-axle vehicle 105 using a front end software module of the system 100 on a display unit 155. The display unit 155 co-operates with the alignment control module 130 and is configured to display the computed "Wheel alignment angles" of all the axles simultaneously of the multi-axle vehicle 105.

In an operative configuration, one wheel target 115 is mounted on each of the axle wheels 110 using a wheel bracket, wherein the wheel target 115 is a passive reflective media without any electronics. Two pairs of camera modules 125*a*, 125*b* are used to carryout alignment in which one pair is for left side and the other pair for the right side of the multi-axle vehicle 105. Each wheel target 115 is fixed to respective axle wheel 110 and the two pairs of camera modules 125*a*, 125*b* measures the "Wheel alignment angles" and "Wheel runout" of all the axle wheels 110 simultaneously. In an embodiment, the simultaneous measurement of "Wheel runout" is done by pushing the multi-axle vehicle 105 backward to a predetermined angle from its original position using a vehicle pusher 160 and then pulled forward again to its original position. In another embodiment, the simultaneous measurement of "Wheel runout" is done by pushing the multi-axle vehicle 105 forward to a minimum predetermined angle until the front axle's wheels are placed on the Rotary plates or Turn tables 170 using a vehicle pusher 160. In an embodiment, the measurement of "Wheel alignment angles" and "Wheel runout" of the axle wheels 110 is done from a distance of maximum but not limited to 19.0 meters from the camera 127 enabling coverage of long multi-axle vehicle 105. The captured images of the plurality of wheel targets 115 are transmitted from the respective camera transceiver 129 of each camera module 125*a*, 125*b* to the central transceiver 135. The processor 140 co-operates with the central transceiver 135 and analyzes the captured images of the wheel targets 115. The distance from 3 directions (X, Y & Z) and three angles (X, Y & Z) are calculated from the captured images. The values related to the above three angles and distances are taken as an input for analyzing and computing the wheel alignment parameters using special algorithms. In one embodiment, algorithms/modules are developed to compute various wheel alignment angles. The programme suitably considers the wheel runout, thrust angle and setback with minimum manual interventions. The captured images are processed using various techniques, such as 'Edge Detection Technique', which measures the wheel angles in 3 directions, i.e. vertical, horizontal and perpendicular to the camera modules 125*a*, 125*b*. These three wheel angles are used for calculating the various "wheel alignment angles" specified by the vehicle manufacturer.

The calculated values of the wheel angles are then displayed graphically in real time on the display unit 155 using alignment control module. The processor 140 compares the calculated wheel alignment angles with the pre-stored wheel alignment angles of the respective multi-axle vehicle 105 from the repository 145 and guides the user via the display unit 155 in adjusting the wheel angles to the required specifications recommended by the original equipment manufacturer. The processor 140 co-operates with the input device 150 to obtain relevant user input, wherein the input device 150 is configured to allow the user to interface with the system 100 as mandated. The input device 150 is further configured to receive the instructions from the user and forward the received instructions to the processor 140. In an embodiment, the input device is in wired or wireless communication with the processor 140.

The system 100 of the present disclosure is also effectively used for facilitating wheel alignment of wheels of a multi-axle vehicle 105 having longer wheel base and track width. Mechanical set up combined with image processing technique is deployed to identify the wheel base distances and position of the camera.

In an exemplary embodiment, the system 100 of the present disclosure is adapted to measure/calculate the Camber, Caster, Toe, Kingpin, Setback, Thrust angle, Scrub angle, Twin Axle parallelism values including Wheel runout of the multi-axle vehicle wheel simultaneously. The system 100 of the present disclosure is comparatively less time consuming and requires less human effort, because the system of the present disclosure does not require removal and re-fixing of the wheel targets after completing a set of axles including wheel runout and proceeding to measure the next set of axles in the multi-axle vehicle.

The technical advancements offered by the system of the present disclosure which add to the economic significance of the disclosure include the realization of a system for simultaneous measurement of "Wheel alignment angles" and "Wheel runout" of a multi-axle vehicle that:
 provides simultaneous measurement of "Wheel alignment angles" of all wheels of a multi-axle vehicle;
 provides simultaneous measurement of "Wheel runout" of all wheels of the multi-axle vehicle;
 is very less time consuming
 requires less human effort; and
 can be effectively used for vehicles of various segments.

The disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A system (100) for simultaneous measurement of wheel alignment angles and wheel runout of multi-axle vehicles (105) having a plurality of at least five or more axle wheels (110), said system (100) comprising:
 a plurality of at least ten or more wheel targets (115), wherein each of said plurality of at least ten or more wheel targets (115) is respectively mounted on said axle wheels (110);
 a first vertical column (120a) on a first side of a multi-axle vehicle (105),
 wherein the first vertical column (120a) comprises a first camera module (125a) and a second camera module (125b), which cover the first side of the multi-axle vehicle (105),
 the first camera module (125a) is positioned at a height lower than the second camera module (125b) in such a way that the first camera module (125a) is set to focus on at least two or more axle wheels (110) at a time, comprising at least one axle wheel (110) of a first axle and one axle wheel (110) of a second front axle, and the second camera module (125b) is set to focus on at least three or more axle wheels (110) at a time, comprising at least one axle wheel (110) of a first rear axle, one axle wheel (110) of a second rear axle, and one axle wheel (110) of a third rear axle,
 each of the first camera module (125a) and the second camera module (125b) includes a camera (127), and
 a second vertical column (120b) on a second side of a multi-axle vehicle (105),
 wherein the second vertical column (120b) comprises a first camera module (125a) and a second camera module (125b), which cover the second side of the multi-axle vehicle (105),
 the first camera module (125a) is positioned at a height lower than the second camera module (125b) in such a way that the first camera module (125a) is set to focus on at least two or more axle wheels (110) at a time, comprising at least one axle wheel (110) of a first axle and one axle wheel (110) of a second front axle, and the second camera module (125b) is set to focus on at least three or more axle wheels (110) at a time, comprising at least one axle wheel (110) of a first rear axle, one axle wheel (110) of a second rear axle, and one axle wheel (110) of a third rear axle,
 each of the first camera module (125a) and the second camera module (125b) includes a camera (127),
 wherein the distance between the first vertical column (120a) and the second vertical column (120b) is the width of the multi-axle vehicle (105),
 wherein simultaneously, the cameras (127) included in each of the first camera module (125a) and the second camera module (125b) mounted on both the first vertical column (120a) and the second vertical column (120b) are configured to capture images of said plurality of at least ten or more wheel targets (115); and an alignment control module (130) having a processor (140) co-operating with each of the first camera modules (125a) and the second camera modules (125b) and configured to analyze said captured images to simultaneously compute wheel alignment angles for each of said axle wheels (110) and also to simultaneously compute wheel runout for each of said axle wheels (110), said processor (140) further configured to compare said computed wheel alignment angles with a predetermined range of acceptable wheel alignment angles.

2. The system as claimed in claim 1, wherein said system (100) further includes at least a first vertical column (120a) configured to facilitate mounting of said at least one second camera module (125b) and at least a second vertical column (120b) configured to facilitate mounting of said at least one second camera module (125b).

3. The system as claimed in claim 1, wherein each of the first camera module (125a) and the second camera module (125b) further includes a camera transceiver (129) configured to co-operate and receive said captured images from said camera (127), and further configured to transmit said captured images to said alignment control module (130).

4. The system as claimed in claim 1, wherein said system (100) further includes an alignment control module (130) configured to variably illuminate said plurality of at least ten or more wheel targets (115).

5. The system as claimed in claim 1, wherein said alignment control module (130) further includes:
a central transceiver (135) co-operating with each of the first camera modules (125a) and the second camera modules (125b) and configured to receive said captured images; and
a repository (145) configured to store said predetermined set of data including acceptable ranges of wheel alignment angles.

6. The system as claimed in claim 1, wherein said system (100) further includes a display unit (155) co-operating with said alignment control module (130) and configured to display said compared wheel alignment angles of said multi-axle vehicle (105).

7. The system as claimed in claim 1, wherein said system (100) is communicatively coupled with an input device (150), said input device (150) allowing a user to interface with the system (100) as mandated.

* * * * *